(12) United States Patent
Bae

(10) Patent No.: US 11,217,863 B2
(45) Date of Patent: Jan. 4, 2022

(54) BATTERY PACK

(71) Applicant: SAMSUNG SDI CO., LTD., Yongin-si (KR)

(72) Inventor: Sang Hoon Bae, Yongin-si (KR)

(73) Assignee: SAMSUNG SDI CO., LTD., Yongin-si (KR)

(*) Notice: Subject to any disclaimer, the term of this patent is extended or adjusted under 35 U.S.C. 154(b) by 99 days.

(21) Appl. No.: 16/473,705

(22) PCT Filed: Oct. 16, 2017

(86) PCT No.: PCT/KR2017/011411
§ 371 (c)(1),
(2) Date: Jun. 26, 2019

(87) PCT Pub. No.: WO2018/128249
PCT Pub. Date: Jul. 12, 2018

(65) Prior Publication Data
US 2019/0348661 A1     Nov. 14, 2019

(30) Foreign Application Priority Data

Jan. 4, 2017    (KR) .................... 10-2017-0001355

(51) Int. Cl.
*H01M 50/502*    (2021.01)
*H01M 10/613*    (2014.01)
(Continued)

(52) U.S. Cl.
CPC ....... *H01M 50/502* (2021.01); *H01M 10/613* (2015.04); *H01M 50/10* (2021.01); *H01M 50/20* (2021.01); *H01M 50/529* (2021.01)

(58) Field of Classification Search
CPC .......... H01M 2/02; H01M 2/206; H01M 2/26; H01M 2/1077; H01M 50/502; H01M 10/613
See application file for complete search history.

(56) References Cited

U.S. PATENT DOCUMENTS

2002/0022178 A1    2/2002   Asaka et al.
2009/0104513 A1    4/2009   Um
(Continued)

FOREIGN PATENT DOCUMENTS

JP    2002-008627 A    1/2002
JP    2009-123371 A    6/2009
(Continued)

OTHER PUBLICATIONS

Seon Jun Ha, Battery Pack, Sep. 2, 2016, KR20160103848 Machine translation (Year: 2016).*

(Continued)

*Primary Examiner* — Kwang Han
*Assistant Examiner* — Bartholomew A Hornsby
(74) *Attorney, Agent, or Firm* — Lee IP Law, P.C.

(57) ABSTRACT

Disclosed is a battery pack comprising multiple secondary batteries and allowing a reduction in the number of components and an increase in cooling efficiency. Disclosed as an embodiment is a battery pack comprising: multiple battery cells, each comprising a first electrode and a second electrode formed opposite the first electrode; first tabs coupled to the first electrodes; second tabs connected to the second electrodes of the battery cells and formed so as to extend towards the areas in which the first tabs are positioned; and a cover which accommodates the battery cells, first tabs, and second tabs and from one side of which the first tabs and second tabs protrude, and bus bars electrically connected to the battery cells at the one side of the cover from which the first tabs and second tabs protrude.

13 Claims, 6 Drawing Sheets

(51) Int. Cl.
*H01M 50/10* (2021.01)
*H01M 50/20* (2021.01)
*H01M 50/529* (2021.01)

(56) References Cited

U.S. PATENT DOCUMENTS

| | | | |
|---|---|---|---|
| 2011/0052939 A1 | 3/2011 | Kim et al. | |
| 2013/0052487 A1 | 2/2013 | Park | |
| 2014/0255748 A1* | 9/2014 | Jan | H01M 10/04 429/120 |
| 2014/0255750 A1* | 9/2014 | Jan | H01M 50/502 429/120 |
| 2015/0255225 A1 | 9/2015 | Kusaba et al. | |
| 2016/0248068 A1 | 8/2016 | Ha | |
| 2016/0285142 A1* | 9/2016 | Kimura | B60L 58/27 |
| 2016/0322614 A1 | 11/2016 | Kim et al. | |

FOREIGN PATENT DOCUMENTS

| | | |
|---|---|---|
| JP | 4761726 B2 | 8/2011 |
| JP | 2011-171125 A | 9/2011 |
| JP | 2016-516273 A | 6/2016 |
| KR | 10-2009-0022892 A | 3/2009 |
| KR | 10-2011-0021208 A | 3/2011 |
| KR | 10-2013-0024752 A | 3/2013 |
| KR | 10-1479607 B1 | 1/2015 |
| KR | 10-2015-0070241 A | 6/2015 |
| KR | 10-2016-0103848 A | 9/2016 |
| KR | 20160103848 A * | 9/2016 ......... H01M 2/1016 |
| KR | 10-2016-0128793 A | 11/2016 |
| KR | 20160150405 A * | 12/2016 ......... H01M 2/0212 |

OTHER PUBLICATIONS

Young, Rechargeable Battery and Rechargeable Battery Module, KR 20160150405 Machine translation, (Year2016) (Year: 2016).*
Akihiro Shimamura et al., Improving the thermal conductivity of epoxy composites using a combustion-synthesized aggregated β-Si3N4 filer, 2020, Scientific Reports, Article 14926, p. 1 (Year: 2020).*
International Search Report dated Feb. 19, 2018 for PCT/KR2017/011411.
Korean Office action dated May 28, 2018 for corresponding application KR 10-2017-0001355.
Notice of Allowance dated Apr. 19, 2019 for corresponding application KR 10-2017-0001355.

* cited by examiner

BATTERY PACK

CROSS-REFERENCE TO THE RELATED APPLICATION

This is the U.S. national phase application based on PCT Application No. PCT/KR2017/011411, filed Oct. 16, 2017, which is based on Korean Patent Application No. 10-2017-0001355, filed Jan. 4, 2017, the entire contents of all of which are hereby incorporated by reference.

TECHNICAL FIELD

The present invention relates to a battery pack including multiple secondary batteries and allowing a reduction in the number of components and an increase in cooling efficiency.

BACKGROUND ART

A rechargeable battery can be charged and discharged repeatedly, unlike a primary battery that cannot be recharged. Low-capacity rechargeable batteries can be used as a power supply for small electronic devices, such as cellular phones, notebook computers, and camcorders, while high-capacity rechargeable batteries can be used as a power supply for driving motors in hybrid vehicles, electric vehicles, and the like.

For example, each unit of such a rechargeable battery is referred to a battery cell, which is generally configured as a cylindrical battery, a pouch type battery or a prismatic battery. As one of representative examples of the rechargeable battery, the cylindrical battery includes an electrode assembly performing charging and discharging operations, a case accommodating the electrode assembly, and a cap-up structure coupled to an opening of the case.

Meanwhile, the batter pack is configured to provide required voltages and currents by connecting multiple battery cells in series, in parallel or in series/in parallel. In particular, since a large-capacity battery pack employed to an automotive vehicle includes multiple battery cells connected to one another, a lot of assembling works are required and a cooling structure for ensuring safety is required.

Technical Problems to be Solved

The present invention provides a battery pack including multiple secondary batteries and allowing a reduction in the number of components and an increase in cooling efficiency.

Technical Solutions

In accordance with an aspect of the present invention, the above and other objects can be accomplished by providing a battery pack including multiple battery cells, each comprising a first electrode and a second electrode located opposite to the first electrode, first tabs coupled to the first electrodes, second tabs connected to the second electrodes of the battery cells and located so as to extend towards areas in which the first tabs are positioned, a cover which accommodates the battery cells, first tabs, and second tabs and from one side of which the first tabs and second tabs protrude, and bus bars electrically connected to the battery cells at the one side of the cover, from which the first tabs and second tabs protrude.

Here, each of the bus bars may connect the battery cells of at least two neighboring lines to one another in parallel by connecting the first tabs of the battery cells of one line to the first tabs of the battery cells of another line adjacent to the one line.

In addition, the bus bar may connect the battery cells of at least two neighboring lines to one another in series by electrically connecting the second tabs of the battery cells of at least two parallel-connected lines to the first tabs of the battery cells of a line adjacent to the two parallel-connected lines.

In addition, the bus bar may include a first cell connecting portion connecting the battery cells of a one line, a second cell connecting portion connecting the battery cells of another line adjacent to the one line, and a bridge portion connecting the first cell connecting portion and the second cell connecting portion.

In addition, the bus bar may include multiple bus bars, and the multiple bus bars are arranged such that at least one of the first cell connecting portion and the second cell connecting portion is engaged with another bus bar adjacent thereto.

In addition, the cover may include holes located in its one surface, the holes through which the first and second tabs of the battery cells protrude, and the bus bars may be coupled to the first and second tabs on one surface of the cover.

In addition, the other surface of the cover opposite to the first surface may be electrically disconnected from the battery cells to then be directly coupled to an external structure.

In addition, the bus bar may include multiple bus bars, and insulators may further be provided between each of the bus bars.

In addition, each of the battery cells may be configured as a cylindrical battery including a case and a cap-up located at an upper portion of the case, and the first tab may be coupled to the cap-up and the second tab may be coupled to the case.

In addition, the first and second tabs may be bent toward an upper portion of the cylindrical battery.

Advantageous Effects

As described above, the battery pack according to the present invention can reduce the number of components by providing a first tab coupled to a cap-up and a second tab coupled to a case so as to protrude while passing through the same surface of a first cover covering a battery cell configured as a cylindrical battery and electrically connecting the first tab and the second tab on the same surface of the first cover through a bus bar.

In addition, since a separate structure for electrical connection is not necessarily provided on a second cover opposite to the first cover, the coupling efficiency of a cooling device can be maximized.

| Brief explanation of essential parts of the drawings | |
|---|---|
| 100: Battery pack | 110: Battery cell |
| 111: First tab | 112: Second tab |
| 120: First cover | 130: Second cover |

BEST MODE FOR CARRYING OUT THE INVENTION

Hereinafter, a preferred embodiment of the present invention will be described in detail with reference to the accompanying drawings such that those can easily be embodied by those skilled in the art.

Figure 1:
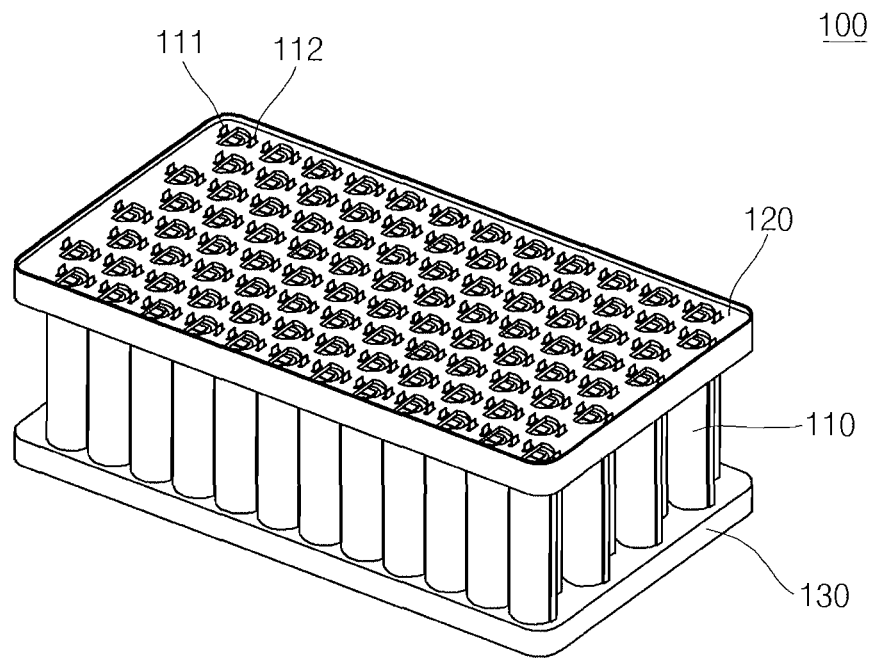
FIG. 1 is a perspective view of a battery pack according to an embodiment of the present invention.
Figure 2:
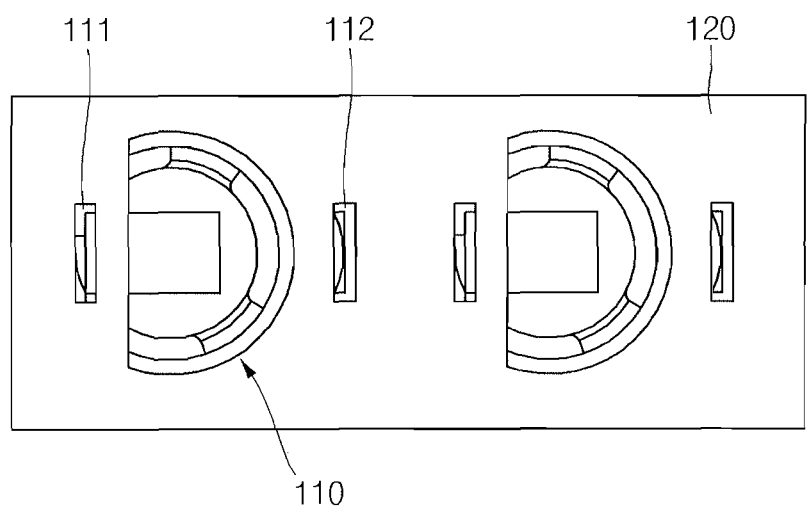
FIG. 2 is a partial plan view illustrating a type in which tabs of battery cells are coupled on a first cover of the battery pack according to an embodiment of the present invention.
Figure 3A:
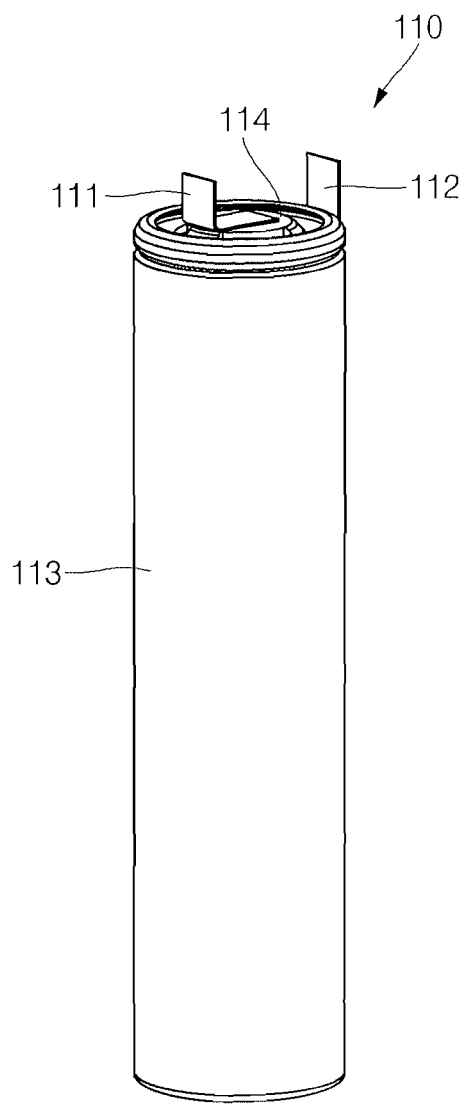
FIG. 3A is a perspective view of a battery cell employed in the battery pack according to an embodiment of the present invention.
Figure 3B:
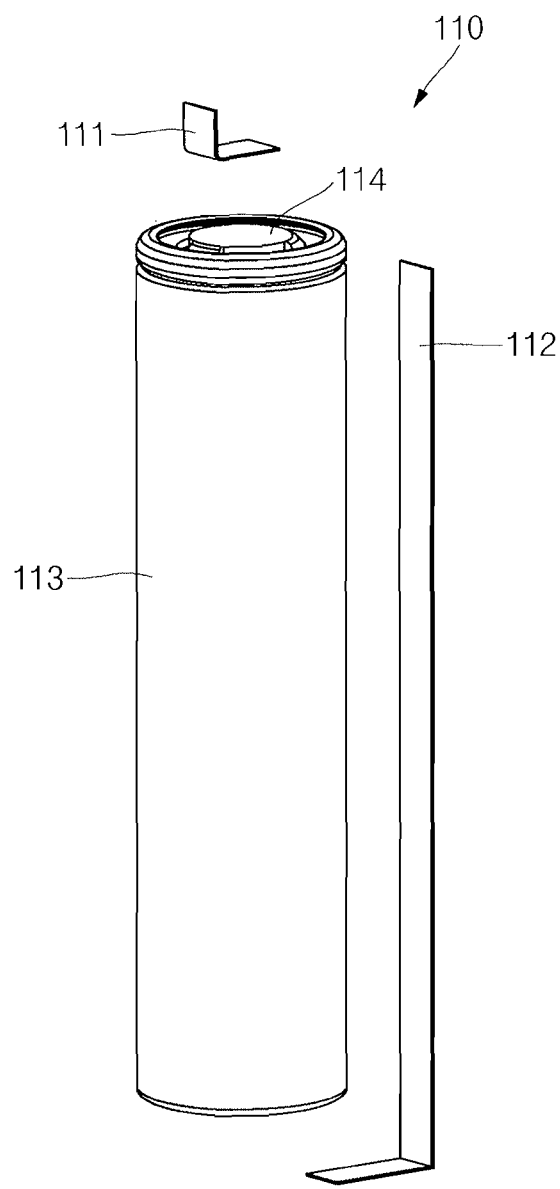
FIG. 3B is an exploded perspective view of the battery cell illustrated in FIG. 3A.
Figure 3C:
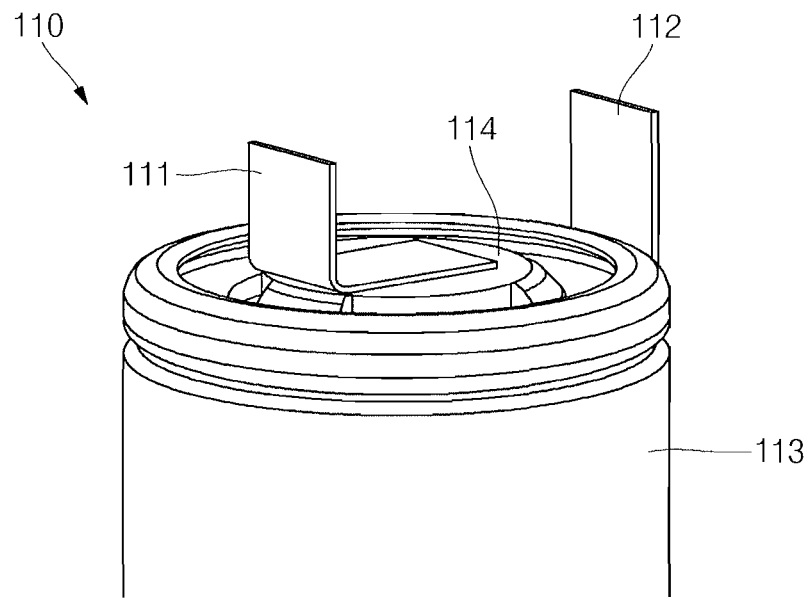
FIG. 3C is an enlarged view of a portion A illustrated in FIG. 3A.
Figure 4:
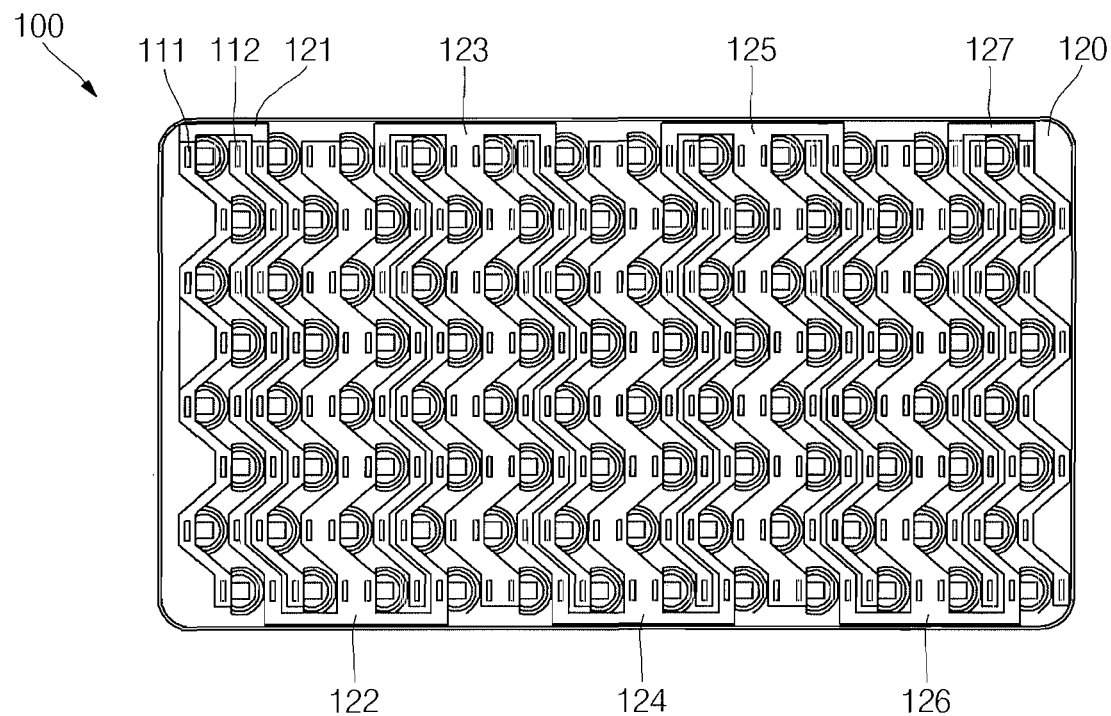
FIG. 4 is a plan view illustrating a state in which bus bars are coupled in the battery pack according to an embodiment of the present invention.
Figure 5:
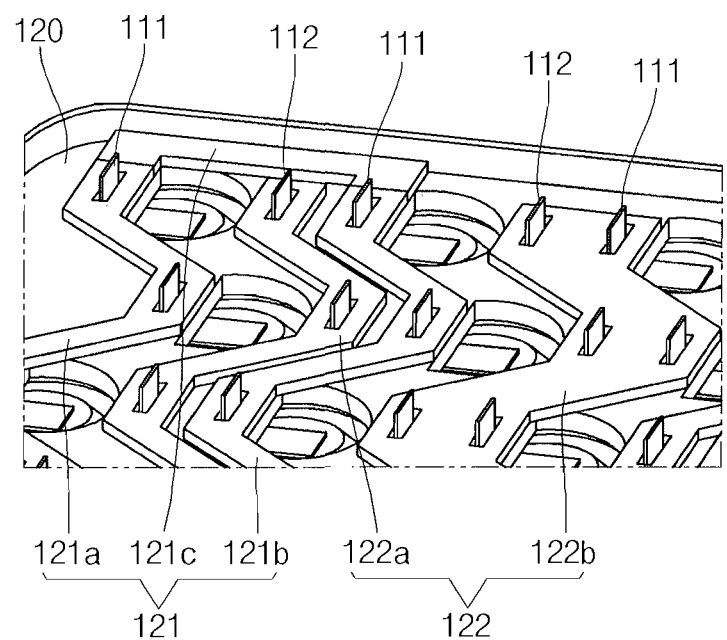
FIG. 5 is a partially perspective view illustrating a state in which bus bars are coupled in the battery pack according to an embodiment of the present invention.
Figure 6:
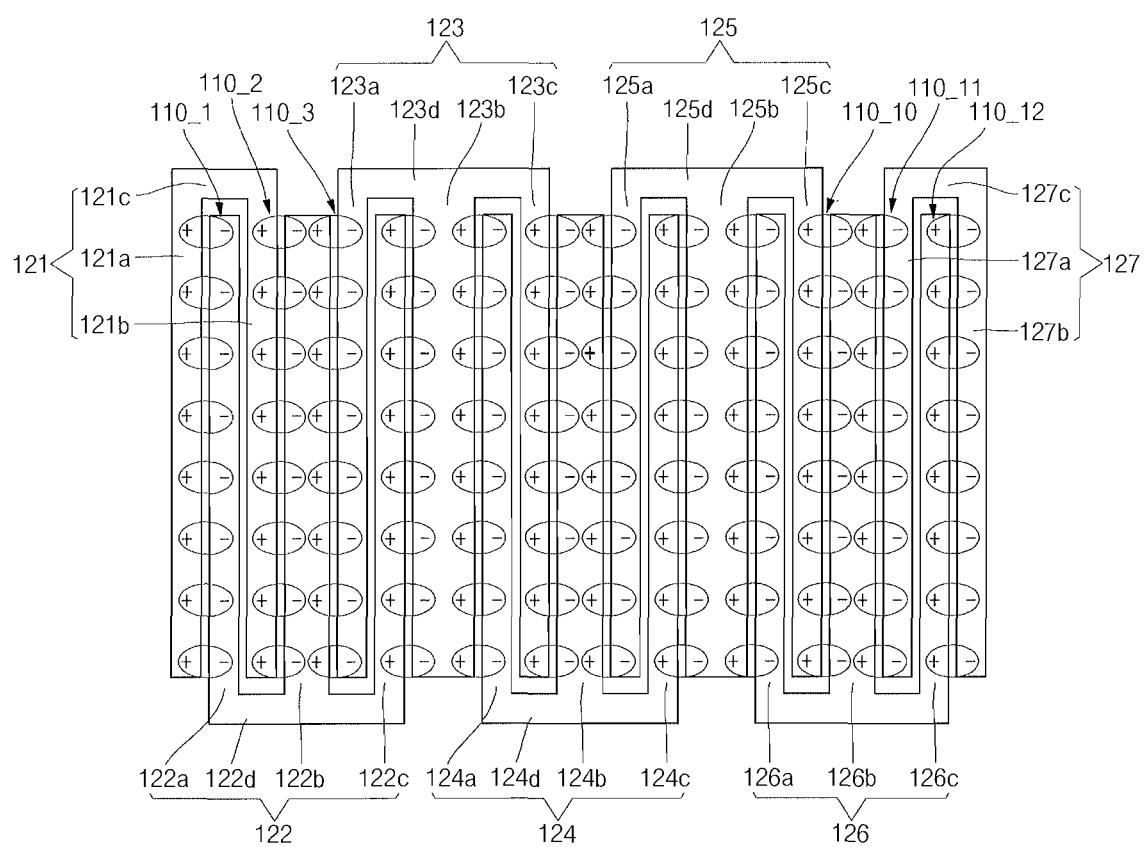
FIG. 6 illustrates electrical connections made by bus bars in the battery pack according to an embodiment of the present invention.

FIG. 1 is a perspective view of a battery pack according to an embodiment of the present invention. FIG. 2 is a partial plan view illustrating a type in which tabs of battery cells are coupled on a first cover of the battery pack according to an embodiment of the present invention. FIG. 3A is a perspective view of a battery cell employed in the battery pack according to an embodiment of the present invention. FIG. 3B is an exploded perspective view of the battery cell illustrated in FIG. 3A. FIG. 3C is an enlarged view of a portion A illustrated in FIG. 3A. FIG. 4 is a plan view illustrating a state in which bus bars are coupled in the battery pack according to an embodiment of the present invention. FIG. 5 is a partially perspective view illustrating a state in which bus bars are coupled in the battery pack according to an embodiment of the present invention. FIG. 6 illustrates electrical connections made by bus bars in the battery pack according to an embodiment of the present invention.

First, referring to FIGS. 1 to 3C, the battery pack 100 according to an embodiment of the present invention includes multiple battery cells 100, and a first cover 120 and a second cover 130, which accommodate the battery cells 110.

The battery cells 110 are configured as rechargeable batteries. The battery cells 110 may be optionally provided as cylindrical batteries, prismatic batteries or pouch type batteries. First tabs 111 and second tabs 112 of the battery cells 110 may be configured in any direction as long as they protrude from the same surface in view of the battery pack 100. For the sake of convenience, a configuration of each of the battery cells 110 will now be described with regard to a cylindrical battery by way of example.

The battery cell 110 may include a case 113 accommodating an electrode assembly (not shown), and a cap-up 114 coupled to a top portion of the case 113. Here, the case 113 may be connected to a positive electrode plate of the electrode assembly to operate as a positive electrode, and the cap-up 114 may be connected to a negative electrode plate of the electrode assembly to operate as a negative electrode. However, the polarities may be reversed according to the choice made by one skilled in the art.

In addition, the first tab 111 of the battery cell 110 may be electrically connected to the cap-up 114, and the second tab 112 may be electrically connected to the case 113.

To this end, the first tab 111 is bent in a roughly L-shaped configuration and a lower region of the bent first tab 111 is coupled to the cap-up 114. An upper region of the bent first tab 111 may upwardly extend so that an end of the upper region protrudes to an upper portion of the first cover 120.

The second tab 112 is also bent in a roughly L-shaped configuration. However, the second tab 112 may be longer than the first tab 111 in a vertical direction. In addition, a lower region of the bent second tab 112 is coupled to a bottom surface of the case 113, and an upper region of the bent second tab 112 may also upwardly extend so that an end of the upper region protrudes to the upper portion of the first cover 120.

Therefore, the first tab 111 and the second tab 112 are both configured to protrude to the upper portion of the first cover 120, so that they are arranged to protrude to the same surface of the battery pack 100, that is, to a top surface of the first cover 120. Eventually, welding has only to be performed on the first cover 120 of the battery pack 100 for coupling a bus bar, which will later be described, thereby enabling automated welding by employing an automatic soldering machine.

In addition, since the first tab 111 and the second tab 112 are positioned on the same surface of the first cover 120, no separate tabs protrude from the second cover 130. Therefore, when a cooling device for cooling the battery pack 100 makes contact with the second cover 130, there is no separate structure, for example, a bus bar, between the battery pack 100 and the cooling device, thereby reducing the number of components while increasing cooling efficiency.

Referring to FIGS. 4 to 6, the first cover 120 is provided on a first surface of the battery cell 110. The first cover 120 is coupled to an area where first tabs 111 and second tabs 112 of multiple battery cells 110 protrude. In more detail, the first cover 120 may be coupled to an area where the cap-up 114 of the battery cell 110 is provided.

In addition, holes are located in the first cover 120 to allow the first tab 111 and the second tab 112 to protrude therethrough. Therefore, the first tab 111 and the second tab 112 may protrude to exterior portions of the first cover 120 to then be exposed. In addition, the first cover 120 is basically made of an insulating material to prevent the battery cell 110 from being short-circuited.

Meanwhile, the first cover 120 may further include bus bars 121 to 127 for connecting the battery cells 110 in series/in parallel.

The bus bars 121 to 127 may be connected to the first tabs 111 or the second tabs 112 of the respective battery cells 110 to connect the multiple battery cells 110 to one another in series/in parallel. In addition, separate insulators may further be provided between each of the bus bars 121 to 127 to prevent the bus bars 121 to 127 from being electrically short-circuited.

For example, a first bus bar 121 among the bus bars 121 to 127 is coupled to the first tabs 111 of a first line 110_1 arranged as a first line in a vertical direction and to the first tabs 111 of a second line 110_2 arranged as a second line in the vertical direction.

To this end, the first bus bar 121 may include a first cell connecting portion 121a positioned along the first line 110_1, a second cell connecting portion 121b positioned along the second line 110_2, and a bridge portion 121c connecting the first cell connecting portion 121a and the second cell connecting portion 121b to each other.

Accordingly, among the multiple battery cells 110, eight (8) cells of the first line 110_1 and eight (8) cells of the second line 110_2 are connected to one another by the first bus bar 121, so that the sixteen (16) cells are connected to one another in parallel.

In addition, a second bus bar 122 among the bus bars 121 to 127 is coupled to the second tabs 112 of the first and second lines 110_1 and 110_2 and to the first tabs 111 of a third line 110_3 arranged as a third line in the vertical direction and a fourth line 110_4 arranged as a fourth line in the vertical direction. Therefore, the 16 cells of the third and fourth lines 110_3 and 110_4 are connected to one another in parallel, and the first and second lines 110_1 and 110_2 of the battery cells 110 are connected to the third and fourth lines 110_3 and 110_4 in series. Accordingly, the first to fourth lines 110_1 to 110_4 are connected to one another in series/in parallel.

In addition, the second bus bar 122 may alternate with the first bus bar 121. In more detail, the second bus bar 122 corresponding to the first bus bar 121 may include a first cell connecting portion 122a connecting the second tabs 112 of the first line 110_1, a second cell connecting portion 122b connecting the second tabs 112 of the second line 110_2 to the first tabs 111 of the third line 110_3, a third cell connecting portion 122c connecting the first tabs 111 of the fourth line 110_4, and a bridge portion 122d connecting the first to third cell connecting portions 122a to 122c to one another. Here, the first cell connecting portion 122a of the second bus bar 122 is positioned between the first and second cell connecting portions 121a and 121b of the first bus bar 121. Conversely, the second cell connecting portion 121b of the first bus bar 121 is positioned between the first and second cell connecting portions 122a and 122b of the second bus bar 122. Therefore, the first bus bar 121 and the second bus bar 122 may be configured to be engaged with each other up and down.

Likewise, the other battery cells 110 may also be connected to one another by the third to sevenths bus bars 123 to 127 in series/in parallel. Therefore, the battery cells 110 are connected to one another in pairs of each two lines 1 and 2, 3 and 4, 5 and 6, 7 and 8, 9 and 10, and 11 and 12, and the respective pairs are connected in series to one another. However, the series/parallel connection relationships may be appropriately modified to supply the voltage/current/power required by a final product.

The second cover 130 is coupled opposite to the first cover 120 in view of the battery cells 110. In addition, since the first and second tabs 111 and 112 of the battery cell 110 are both configured to protrude to the exterior portions of the first cover 120, as described above, in order to electrically connect the battery cells 110, it is not necessary to attach a separate structure to a surface of the second cover 130 opposite to the surface where the battery cells 110 are positioned. Therefore, when a cooling device is coupled to the second cover 130, it can be directly coupled to the second cover 130, thereby reducing the number of components while maximizing the coupling efficiency.

Although the foregoing embodiment has been described to practice the battery pack of the present invention, these embodiments are set forth for illustrative purposes and do not serve to limit the invention. Those skilled in the art will readily appreciate that many modifications and variations can be made, without departing from the spirit and scope of the invention as defined in the appended claims, and such modifications and variations are encompassed within the scope and spirit of the present invention.

INDUSTRIAL APPLICABILITY

The battery pack according to the present invention can reduce the number of components by providing a first tab coupled to a cap-up and a second tab coupled to a case so as to protrude while passing through the same surface of a first cover covering a battery cell configured as a cylindrical battery and electrically connecting the first tab and the second tab on the same surface of the first cover through a bus bar.

In addition, since a separate structure for electrical connection is not necessarily provided on a second cover opposite to the first cover, the coupling efficiency of a cooling device can be maximized.

The invention claimed is:

1. A battery pack, comprising:
multiple battery cells, each battery cell including a first electrode and a second electrode located opposite to the first electrode;
first tabs coupled to the first electrodes;
second tabs connected to the second electrodes and located so as to extend towards areas in which the first tabs are positioned, the first tabs and the second tabs protruding from first ends of the battery cells;
a cover on the first ends of the battery cells, the cover including:
a bottom portion covering the first ends of the battery cells, the bottom portion extending perpendicularly to longitudinal directions of the battery cells, and the first tabs and the second tabs protruding through the bottom portion, and
a sidewall surrounding an outer perimeter of the bottom portion, at least a portion of the sidewall extending perpendicularly to the bottom portion in a direction oriented away from the battery cells; and
bus bars on the bottom portion of the cover and electrically connected to the battery cells through the first tabs and the second tabs, the first and second tabs penetrating through the bus bars to be exposed above respective topmost surfaces of the bus bars, the bottom portion of the cover being between the first ends of the battery cells and the bus bars, and the bus bars, portions of the first tabs above the bus bars, and portions of the second tabs above the bus bars being surrounded by the at least portion of the sidewall of the cover.

2. The battery pack as claimed in claim 1, wherein each of the bus bars connects the battery cells of at least two neighboring lines to one another in parallel by connecting the first tabs of the battery cells of one line to the first tabs of the battery cells of another line adjacent to the one line.

3. The battery pack as claimed in claim 2, wherein at least one of the bus bars connects the battery cells of at least two neighboring lines to one another in series by electrically connecting the second tabs of the battery cells of at least two parallel-connected lines to the first tabs of the battery cells of a line adjacent to the two parallel-connected lines.

4. The battery pack as claimed in claim 1, wherein at least one of the bus bars includes a first cell connecting portion connecting the battery cells of one line, a second cell connecting portion connecting the battery cells of another line adjacent to the one line, and a bridge portion connecting the first cell connecting portion and the second cell connecting portion.

5. The battery pack as claimed in claim 4, wherein the at least one bus bar includes multiple bus bars, and the multiple bus bars are arranged such that at least one of the first cell connecting portion and the second cell connecting portion is engaged with another of the bus bars adjacent thereto.

6. The battery pack as claimed in claim 1, wherein the bottom portion of the cover includes holes through which the first and second tabs of the battery cells protrude.

7. The battery pack as claimed in claim 6, wherein at least the bottom portion of the cover is an insulator.

8. The battery pack as claimed in claim 1, wherein each of the battery cells is a cylindrical battery including a case and a cap-up located at an upper portion of the case, and the first tab is coupled to the cap-up and the second tab is coupled to the case.

9. The battery pack as claimed in claim 8, wherein the first and second tabs are bent toward an upper portion of the cylindrical battery.

10. The battery pack as claimed in claim 1, wherein:
    the battery cells are arranged in zigzag-patterned lines neighboring each other, as viewed in a top view, each of the lines including a predetermined number of battery cells, and
    the bus bars include portions having a zigzag pattern corresponding to the zigzag-patterned lines of the battery cells, as viewed in the top view, each of the portions of the bus bars having the zigzag pattern extending along an entire length of a corresponding zigzag-patterned line.

11. The battery pack as claimed in claim 10, wherein the portions having the zigzag patterns are spaced apart from each other, the portions being connected to each other only at edges thereof.

12. The battery pack as claimed in claim 1, wherein each of the bus bars includes:
    at least two cell connecting portions spaced apart from each other, each of the at least two cell connecting portions extending along an entire line of battery cells, and each of the at least two cell connecting portions connecting the battery cells in the entire line to each other, and
    a bridge portion connecting edges of the at least two cell connecting portions to each other.

13. The battery pack as claimed in claim 12, wherein bridge portions of two adjacent bus bars are at opposite sides of the bottom portion of the cover.

* * * * *